United States Patent [19]
Dozier

[11] 3,924,179
[45] Dec. 2, 1975

[54] METHOD FOR CERTIFYING DEAD CABLES OR CONDUCTORS BY DETERMINING CURRENT PULSE POLARITY

[76] Inventor: William A. Dozier, c/o Georgia Power Company, P.O. Box 1220, Columbus, Ga. 31902

[22] Filed: Apr. 24, 1974

[21] Appl. No.: 463,683

[52] U.S. Cl. .................................. 324/66; 324/67
[51] Int. Cl.² ................... G01R 19/14; G01R 31/02
[58] Field of Search ............ 324/66, 67, 133, 52, 51

[56] References Cited
UNITED STATES PATENTS

| | | | |
|---|---|---|---|
| 2,789,268 | 4/1957 | Bechtel et al. | 324/66 |
| 3,076,931 | 2/1963 | Jasper | 324/67 X |
| 3,623,142 | 11/1971 | Key | 324/66 |

FOREIGN PATENTS OR APPLICATIONS

| | | | |
|---|---|---|---|
| 299,916 | 8/1917 | Germany | 324/52 |

Primary Examiner—Gerard R. Strecker
Attorney, Agent, or Firm—Watson, Cole, Grindle & Watson

[57] ABSTRACT

Method and apparatus for certifying a dead insulated electrical conductor among a plurality of conductors by determining the polarity of a net DC pulse in the conductor at any desired test point between the ends of the conductor. The conductor to be certified is connected to an electrical return conductor and a periodic DC current pulse between a test point and the return conductor is generated by coupling a pulse transmitter to the conductor. The net DC pulse in the conductor is detected by electro-magnetically coupling a receiver to the conductor without removing the conductor sheathing.

6 Claims, 17 Drawing Figures

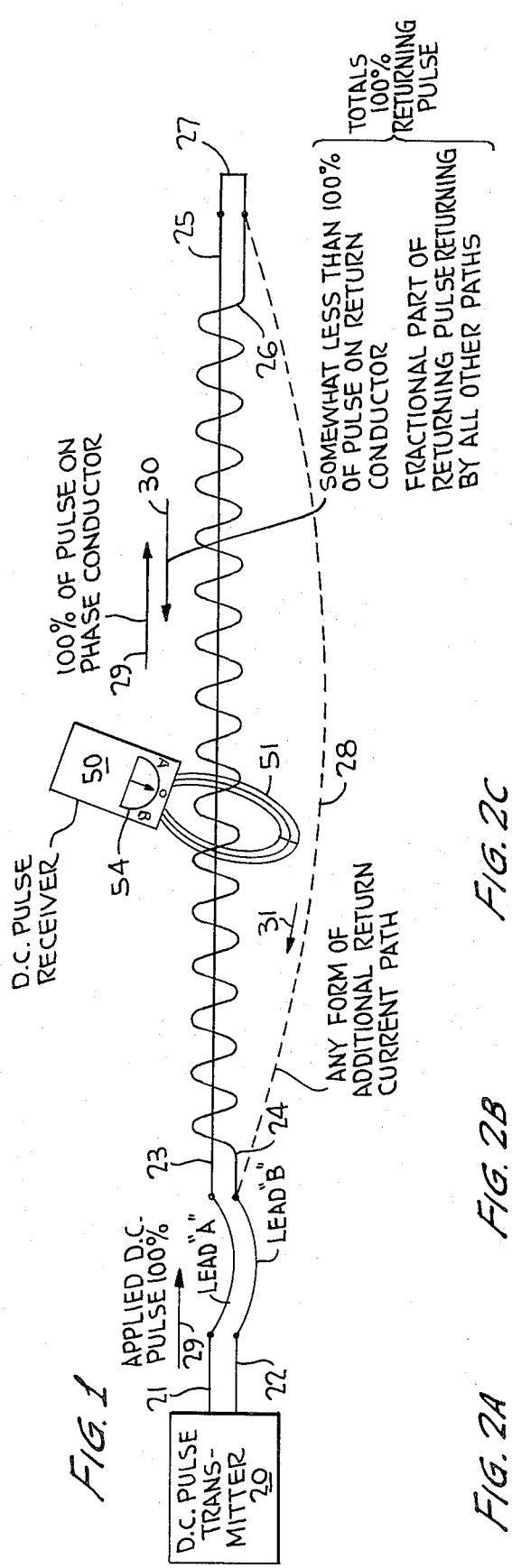

METHOD FOR CERTIFYING DEAD CABLES OR CONDUCTORS BY DETERMINING CURRENT PULSE POLARITY

This invention relates to a method and apparatus for certifying that a particular electrical conductor, group of conductors, or cable assembly is "dead" at any desired point without removing or damaging the conductor insulation along the conductor or cable route between its two ends or terminals at which points the conductors are known to be dead. This method is intended to be used with any single phase or polyphase electrical power transmission or distribution system, telephone cables, telegraph cables, other communication cables, lighting cables, signaling cables, or any other form or use of an electrical conductor where it is desired to determine the condition of a conductor or group of conductors.

BACKGROUND OF THE INVENTION

Frequently it is desirable and necessary to cut into conductors or cables at some point remote from their ends for the purposes of making taps, splicing in an additional loop of cable or for other reasons. A specific example is where a new street is being added in a residential subdivision whereby the homes in the existing subdivision are fed from an underground electrical distribution system. At the point where the new street ties into the existing streets, it is desired to splice a new electrical tap or electrical loop for the new street onto one of the existing underground electrical distribution cables that may run parallel to the old street. The cable that it is desired to cut can be deenergized and grounded at both of its ends or terminals. However, at the new street, if there is more than one cable in the trench, it may not be known which of the cables is deenergized and to be cut at this location.

The method and apparatus provided by this invention utilizes a directional DC pulse of known polarity that is powered, generated, timed, and triggered by a device referred to in this invention as a "DC pulse transmitter", or "transmitter". Some examples of a DC pulse transmitter are shown in FIGS. 3, 4, 5 and 12. The method and apparatus provided by this invention utilize a directional DC pulse detector of known polarity that is referred to in this invention as a "DC pulse receiver", "receiver", or "detector". Some examples of a DC pulse receiver are shown in FIGS. 6, 7, 8 and 13.

One unique property of the method of this invention is that all the conductors associated with a given cable assembly can all be included in the clamp-on current transformer circuit of the receiver and can all be measured at the same time (one or more conductors containing the outgoing pulse from transmitter test lead "A", and one or more return conductors connected to transmitter test lead "B" containing the returning pulse). This is not a necessity for the operation of this invention, but rather an extremely convenient and time-saving feature. Thus, it is not necessary to remove any concentric neutrals, any lead or other sheathing, or any fireproofing from around any of the cables or conductors to be tested whether the cables be of single conductor with return concentric neutral, multiconductor with concentric neutral, individual conductors, polyphase cables with or without lead or other sheathing, telephone cables with or without lead or other sheathing, telegraph or signaling cables or conductors, or any other cable or conductor that is intended to carry an electrical current. If no other current paths existed except those of the conductors within the clamp-on current transformer jaws, then the vector sum of the outgoing pulse and returning pulse would always be zero and, thus, the receiver would always read zero. However, under typical normal field conditions, there frequently exists some form of additional current path that is electrically in parallel with the return conductor and is external to the receiver's current transformer circuit. Any time this additional external parallel path exists, part of the return pulse will be carried by this parallel path. Thus, any time such an additional parallel path exists, then the vector sum of the currents in the conductors within the clamp-on jaws of the receiver will not equal zero — the net outgoing pulse will always be more than the net returning pulse within the receiver clamp-on jaws and this net current in these conductors will always be of the same polarity. The polarity index of the receiver must always face the transmitter. Therefore, the current induced in the receiver's meter will always be of the same polarity and this DC meter will always deflect in the same direction, thus indicating this same polarity. Any time the meter deflects to this same predetermined polarity, the operator is assured that the conductor connected to the transmitter test lead "A" is contained within the receiver clamp-on jaws. If the receiver deflects to the opposite polarity, the operator is assured that the conductor connected to transmitter test lead "A" is not contained within the receiver jaws and the operator is on the wrong cable.

If the above mentioned parallel path or paths external to the receiver jaws do not exist under normal and natural conditions, then it can be created artificially so that positive test results may still be performed.

As a byproduct of the methods and apparatus of this invention, the cables or conductors can be assigned any desired positive identification at the same time the cable or conductor is certified "dead" because it is then known that this "dead" cable or conductor is the same one that is connected to test lead "A" of the transmitter. In all cases, transmitter test lead "A" is connected to the conductor or conductors to be certified "dead"; transmitter test lead "B" is connected to a convenient ground or other return path; the far end of the conductor or conductors is connected to a convenient ground or other return path; and the receiver index always points electrically toward the transmitter for positive results.

The one exception to this rule is where the conductors are contained within a "ferrous" or "ferromagnetic" conduit or sheath at the point where the receiver is to be used. The "ferrous" covering will cause a "magnetic short circuit" or "magnetic shielding" of the DC pulse giving erroneous results. If this is the case, and if practical, the "ferrous" shielding is removed and the method and apparatus are used in the conventional manner. If it is not practical to remove the "ferrous shielding", and if the "ferrous shielding" is a continuous electrical conducting path itself throughout the entire length of the run, then the metallic shielding itself may be used as the test conductor by electrically isolating it from grounds at the transmitter end. Transmitter lead "A" is attached to this shielding and test lead "B" is attached to a good neutral, water pipe, other cable shield, or ground system, or other convenient return conductor. At the far end, a jumper is connected from the shielding to a good neutral, water pipe, other cable shield, or ground system, or other convenient return conductor. Then the test proceeds using this "ferrous" shielding as the "conductor under test". The success of this modified method depends on the quality of the ground return path as well as the amount of grounding on the "ferrous shield" under test.

The principal object of this invention is to provide a novel method and means for quickly, accurately, and safely certifying that the particular conductor, conductors, or cables of any of the above mentioned systems are deenergized and "dead" at a particular point remote from the conductor power source so that it may be cut and handled with safety.

BRIEF DESCRIPTION OF THE DRAWINGS

FIG. 1 is a diagrammatic illustration of the principle of the method and apparatus of the invention;

FIGS. 2A–2E illustrate DC pulse waveforms used in the invention;

FIG. 3 represents an example of the type of DC pulse transmitter used in the invention;

FIG. 12 is an embodiment of a DC pulse transmitter; and

FIG. 13 is an embodiment of a DC pulse receiver.

Figure 4:
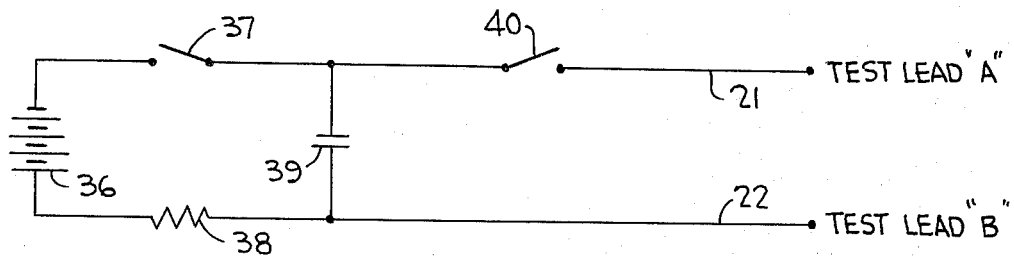
FIGS. 4, 5 and 12 illustrate specific embodiments of DC pulse transmitters used in the invention.

Following are definitions of some of the terms as used throughout this invention. A "DC pulse", or "pulse", is defined as any pulse whose average value throughout the life of the pulse can be considered as either electrically positive or negative, and may have any wave shape whether square wave, triangular, sawtooth, fast rise time with exponential decay, fast rise time with oscillatory exponential decay, or any combination thereof, or any other wave shape that has an average DC value of either positive or negative throughout the life span of the wave. "Certify" is defined as to make certain that a particular conductor is dead. "Dead" is defined as deenergized, or disconnected from its power source.

DESCRIPTION OF OPERATION

FIG. 1 is a diagrammatic illustration of the principle of the method and apparatus of this invention showing the manner in which it is possible to certify that a cable or conductor is dead at any point between, and remote from, its two ends. DC pulse transmitter 20 is connected through test lead 21 "A" to conductor 23 under test. Transmitter test lead 22 "B" is connected to electrical return conductor 24. The far end 25 of conductor 23 under test is connected by jumper 27 to return conductor 26. Return conductor 26 may be the concentric neutral or other neutral associated with the conductor under test; a lead or other metallic sheathing associated with the conductor under test; a metallic sheath of another cable nearby; or any other electrical conducting path including earth that is continuous from the transmitter end of the conductor 23 under test to the far end 25 of that conductor. At any point along the cable route that it is desired to certify the cable "dead", clamp-on jaws 51 of DC pulse receiver 50 are clamped around the conductor 23 under test with the receiver index electrically facing the transmitter, including any concentric neutral 24, 26, lead or other sheathing that may be present.

Figure 9:
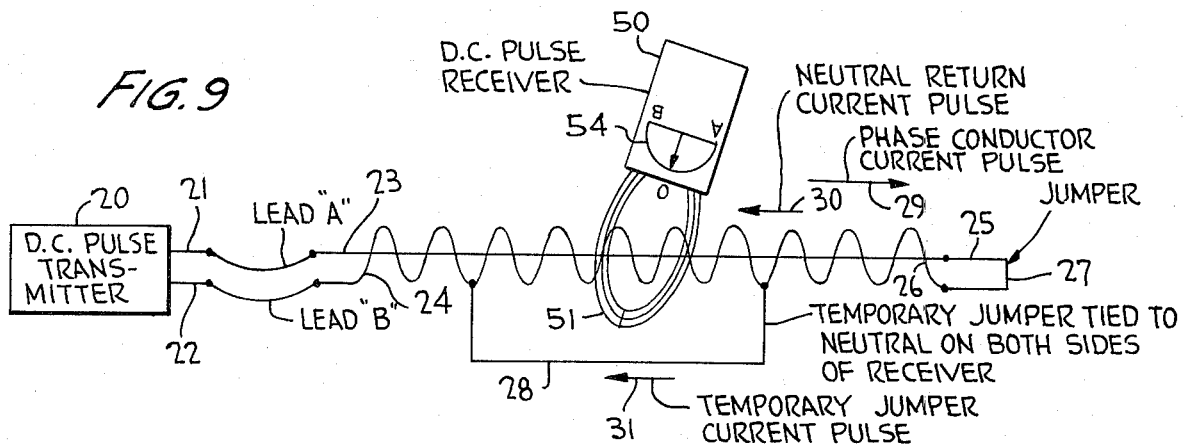
FIG. 9 illustrates the principle of the method and apparatus in the situation where there are no additional parallel return paths of sufficiently low resistance to provide a positive indication on the DC pulse receiver meter.

Under typical field conditions, multiple earth grounds, neutrals of other cables, separate neutrals, or metallic sheaths of other cables may exist between points 24 and 26 of the normal return path. If any of the aforementioned return paths exist, they will form an additional parallel return path 28 for the returning pulse. If none of these additional return paths exists naturally, then such a parallel return path can be created artificially by connecting electrical jumper 28 to return conductor 24, 26 on each side of receiver 50 at the test point as shown in FIG. 9. With concentric neutral cables or metallic sheathed cables, this can easily be done by merely wrapping or clamping jumper 28 around metallic neutral or sheathing 24, 26 and this jumper must be outside receiver jaws 51. This external parallel path 28 can also be another neutral, water pipe, other cable shield, or ground system, or any other convenient return conductor external to receiver jaws 51.

This set-up is now ready for a test. Transmitter 20 and receiver 50 are both turned on. DC pulse 29 is applied by transmitter lead 21 to conductor 23, it passes through receiver jaws 51 to the far end 25 of conductor 23, through jumper 27, and returns through 26 and parallel path 28 back to transmitter lead 22. At the receiver 50 location, all of pulse 29 passes through receiver jaws 51; however, the returning pulse has split so that only part of the returning pulse 30 passes in the opposite direction than pulse 29 through receiver jaws 51. The other part of the return pulse 31 returns external to the receiver jaws 51, through additional return path 28 so that the algebraic sum of return pulse 30 and return pulse 31 is always equal to and opposite outgoing pulse 29. Therefore, the algebraic sum of pulse 29 and pulse 30 through the receiver jaws 51 will never be zero — pulse 29 will always be greater and of the same predetermined polarity. With the index of receiver 50 always electrically facing the transmitter, receiver meter 54 will always deflect to the same predetermined polarity or toward "A" in this example. (For the purposes of these examples, the receiver meter face is used as the receiver index so that the meter face always electrically faces the transmitter.) If there is no meter deflection when the transmitter pulses, or if the meter deflects toward "B", then receiver 50 is clamped around the wrong cable (returning current 31 in any other cable path will always be opposite in polarity to pulse 29 and will give an opposite deflection on meter 54.) If the meter 54 does deflect toward "A", the operator is assured that test conductor 23, 25 is contained within receiver jaws 51. As a byproduct of this method, this conductor or cable at this remote receiver 50 location can be assigned the same identification name, letter, or number at this remote location that the conductor 23 bears at the transmitter terminal, or any other convenient identification may be assigned.

FIGS. 2A to 2E show some various pulse waveforms that may be used with the method of the invention. FIG. 2B and FIG. 2C are representative of the waveforms that are to be expected from a capacitor discharge type of pulse transmitter as shown in FIG. 4 and FIG. 5.

FIG. 3 shows the general form of DC pulse transmitter 20 as used in this invention. Power supply 32 furnishes electrical power for pulse generator 33. Pulse switching circuit 34 electrically connects the pulse through test leads 21 and 22 to the conductor or cable under test. Pulse timing and triggering circuits 35 control switching circuit 34 to apply the pulses to the conductor or cable under test at a specified repetition rate. Pulses spaced from 1 second to 10 seconds apart have generally been found to be preferable.

FIG. 4 shows a specific form of DC pulse transmitter 20. DC power source 36 may be either a battery, a DC generator, an inverter power supply fed from a low voltage battery, or rectified alternating current. DC power source 36 furnishes power through on-off switch 37 and current limiting resistor 38 to charge capacitor 39. Pulse switching device 40 may be either mechanical, electromechanical, electronic, or other switching device. When it closes, switch 40 connects charged capacitor 39 through test leads 21 and 22 to the conductor or cable under test. This causes capacitor 39 to discharge its energy in the form of a DC pulse 29 into the conductor under test.

Figure 5:
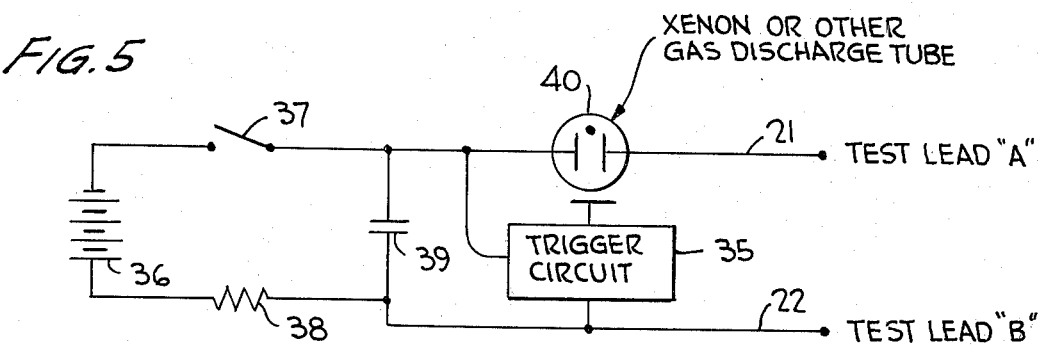

FIG. 5 shows another specific form of DC pulse transmitter 20 that is similar in operation to the transmitter of FIG. 4. Switch 40 is illustrated as a xenon or other gas discharge tube together with its triggering circuit and automatic timing circuit 35. This conduit is basically the same as the circuit of an inexpensive electronic photoflash unit. A simple electronic photoflash unit can easily be modified so that it can be used as DC pulse transmitter 20 by opening the photoflash tube circuit and connecting test leads 21 and 22 in series with the flash tube. An automatic timing device can be added to actuate the discharge tube trigger circuit. The photoflash tube has an advantage that may be desirable in that it puts out a bright flash of light each time the transmitter 20 pulses. Whenever the tube is flashing, the operator is assured that the transmitter is working properly.

Figure 6:
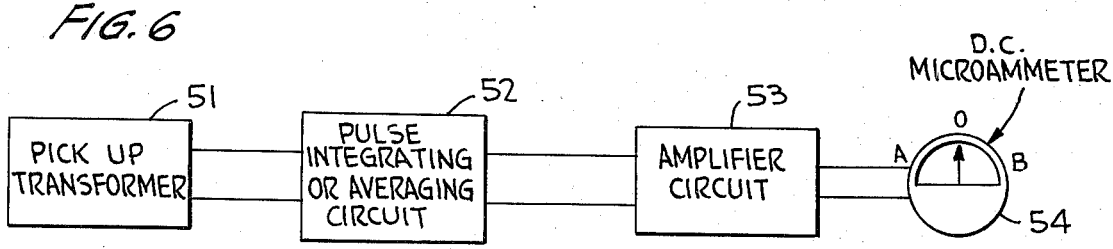
FIG. 6 represents an example of the type of DC pulse receiver used in the invention.

FIG. 6 shows the general form of DC pulse receiver 50. The circuit consists of pickup transformer 51 with movable electromagnetic jaws that can be physically clamped around the conductor 23, 25 under test. The output current from pickup transformer 51 feeds into pulse integrating or averaging circuit 52. Integrating circuit 52 changes the waveshape of DC pulse 29 from a very short duration pulse to a pulse of long enough duration that it can be registered on DC microammeter 54. This integrated pulse from integrating circuit 52 is fed either into amplifier circuit 53 or directly into DC microammeter 54 depending on the required sensitivity. When pickup transformer 51 is correctly oriented with respect to transmitter 20, then microammeter 54 will always deflect toward "A" on the meter provided that test conductor 23, 25 is contained within pickup transformer jaws 51. If a pulse of opposite polarity should pass through transformer jaws 51, then meter 54 would deflect toward "B".

Figure 7:
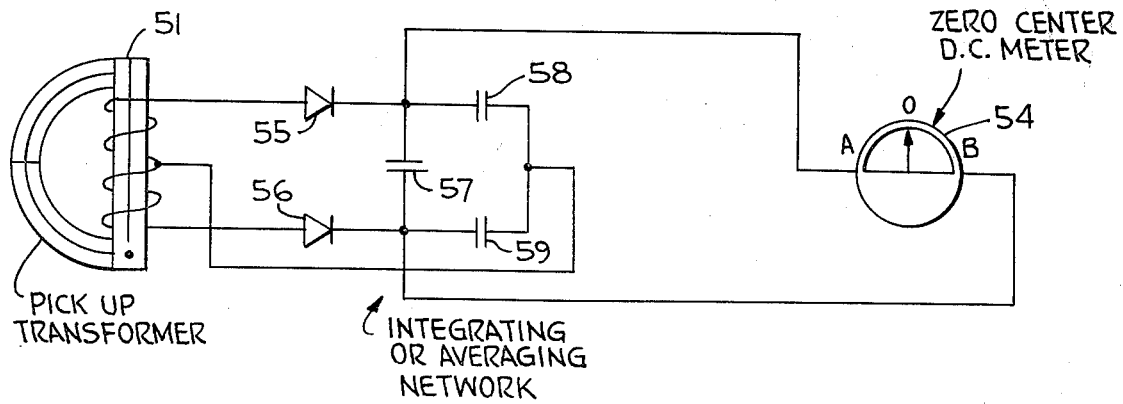
FIGS. 7, 8 and 13 illustrate specific embodiments of DC pulse receivers used in the invention.

FIG. 7 shows a specific form of DC pulse receiver 50 without an amplifier. Pickup transformer 51 utilizes a three-lead centertapped coil that feeds through two diodes 55 and 56 into an integrating and voltage divider network composed of capacitors 57, 58, and 59. The voltage across capacitor 57 is fed directly to a zero center DC microammeter 54. This centertapped pickup transformer coil 51, together with diodes 55 and 56 and capacitor 57, 58, and 59, has an advantage in that it is sensitive only to the DC pulses. Any sine wave alternating current that should happen to be picked up by pickup transformer 51 will automatically be cancelled out by this circuitry and will not overload capacitors 57, 58, and 59 or DC meter 54.

Figure 8:
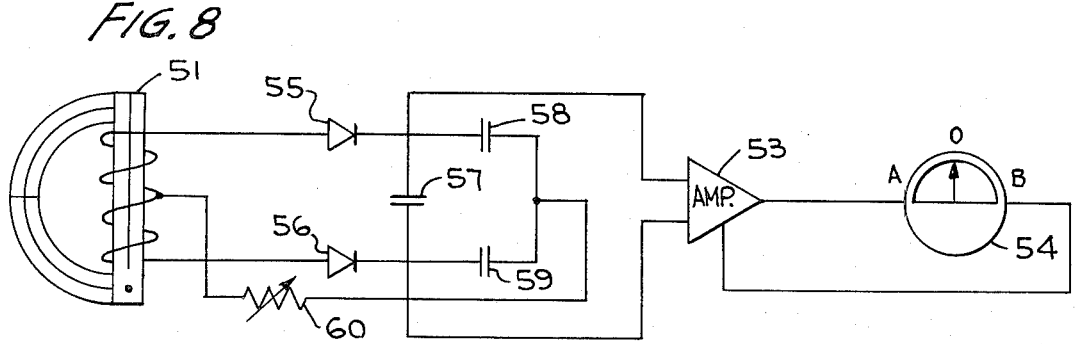

FIG. 8 shows another specific form of DC pulse receiver 50 that is very similar in operation to receiver 50 shown in FIG. 7. This receiver 50 has gain control 60 and amplifier 53 making it very much more sensitive. With its greater sensitivity and variable gain control, it can be used throughout a very wide number of applications. The amplifier may consist of either transistors or integrated circuits, or other electronic apparatus.

FIG. 9 is a diagrammatic illustration of the principle of the method and apparatus of this invention showing that it is possible to certify that a cable or conductor is dead when there are no additional parallel return paths of sufficiently low resistance to give a positive indication on meter 54 of DC pulse receiver 50. This test case works well with concentric neutral cables, lead sheathed cables, or any other type of cable having an exposed metallic outer covering or sheathing. DC pulse transmitter 20 is connected through test lead 21 "A" to conductor 23 under test. Transmitter test lead 22 "B" is connected to the outer concentric neutral, lead or other metallic sheathing as return conductor 24. The far end 25 of test conductor 23 is connected by jumper 27 to return conductor 26. At the remote point where the cable is to be certified dead, a temporary electrical jumper is connected to the concentric neutral or metallic sheathing on each side of receiver jaws 51. These two connections may be as close together as is convenient — a foot or so between connections is sufficient. This jumper must lie outside of receiver jaws 51. Receiver meter 54 will now give a positive "A" deflection if jaws 51 are clamped around the correct conductor under test.

Figure 10:
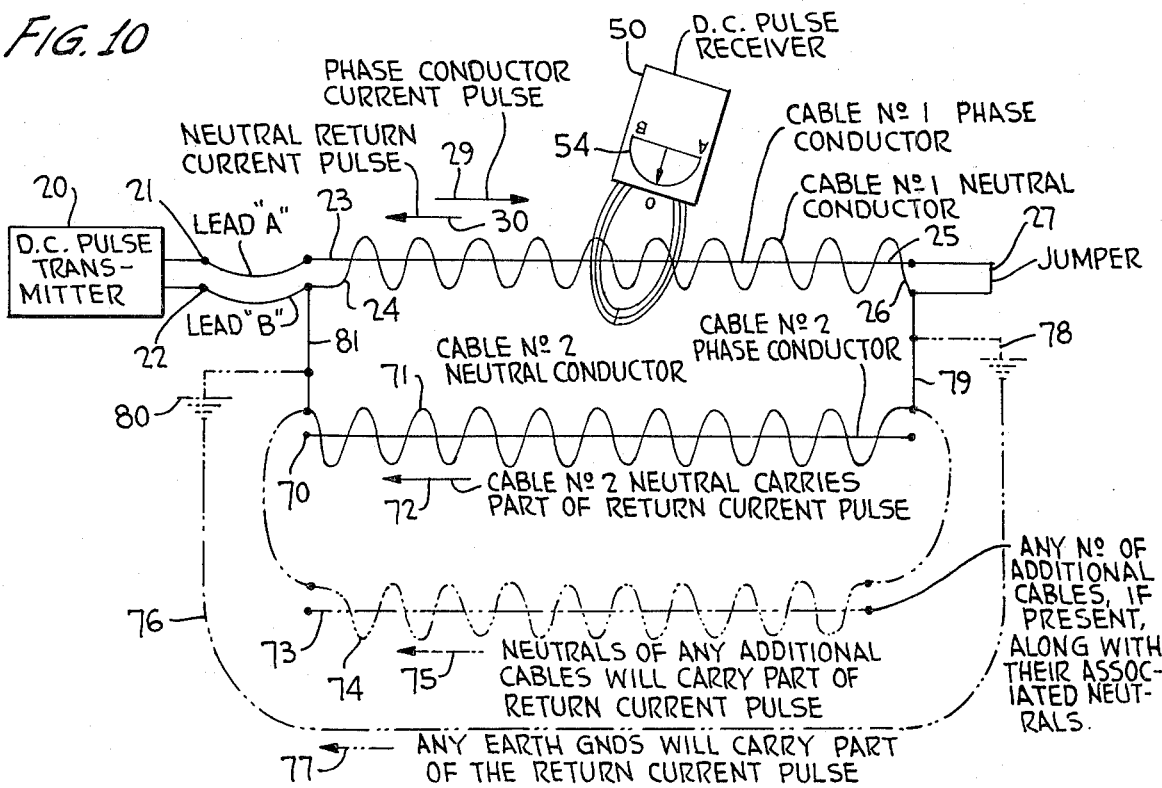
FIG. 10 illustrates the principle of the method and apparatus in the situation where in the most generally encountered field situation, two or more cables lie adjacent to each other and one cable is to be certified "dead"

FIG. 10 is a diagrammatic illustration of the principle of the method and apparatus of this invention that is most likely to be encountered under actual field conditions, wherein two or more cables lie adjacent to each other and one of the cables 23, 25 is to be certified dead while any or all of the other cables may either be energized or deenergized. If any of the cables are energized and carrying current, it is very likely that some alternating current can also be flowing in neutral 24, 26 of cable 23, 25 under test. Typically all of the neutrals will be tied together at near end 81 and also at far end 79, and also grounded at near end 80 and far end 78. In this test case DC pulse transmitter 20 is connected through test lead 21 "A" to conductor 23 under test. Transmitter test lead 22 "B" is connected to the common bonded neutral system 81. The far end 25 of test conductor 23 is connected by jumper 27 to common neutral point 79. This test case provides several additional parallel return paths, namely 71, 74, and 76. No additional connections should be required. At the remote point where cable 23, 25 is to be certified dead, the receiver jaws 51 are clamped around the entire cable assembly under test and meter 54 will now give a positive "A" deflection if receiver jaws 51 are clamped around the correct test conductor 23, 25. If receiver 50 should happen to be clamped around the wrong cable, meter 54 will either give a "B" deflection or no deflection at all.

Figure 11:
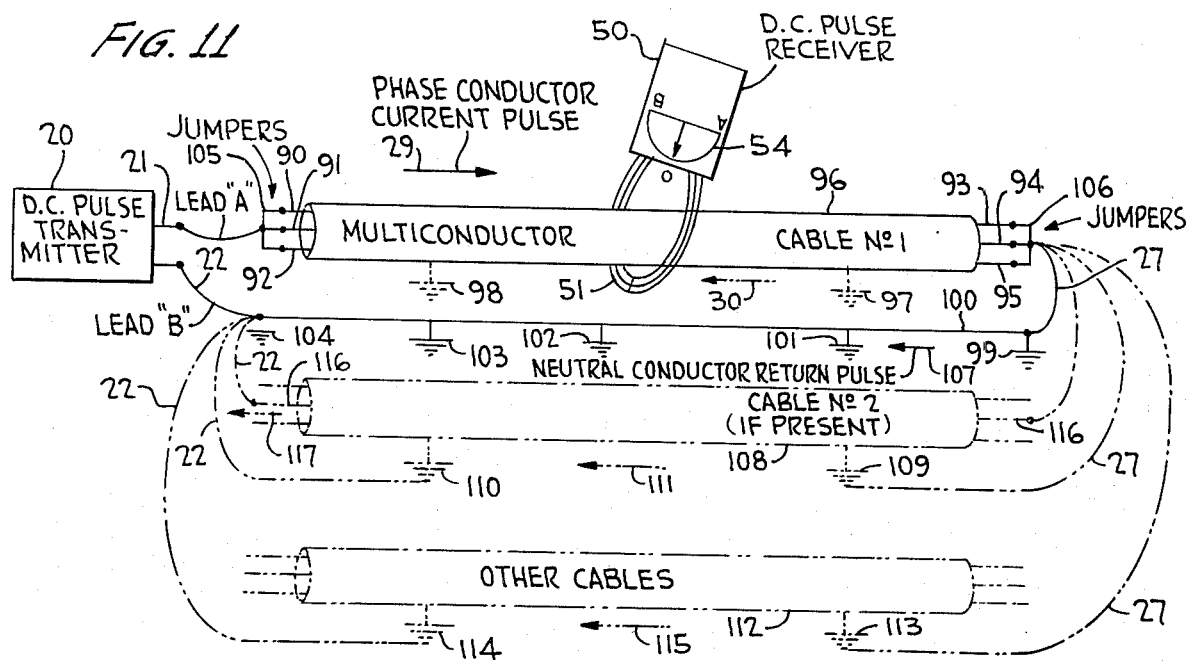
FIG. 11 illustrates the principle of the method and apparatus for another actual field situation.

FIG. 11 is a diagrammatic illustration of the principle of the method and apparatus of this invention that is also very likely to be encountered under actual field conditions. The cables may be either single conductor or multiple conductor electric power conductors, or may be telephone cables, telegraph or other communication or signaling cables, or any other kind of cable intended to carry an electrical current. In this test case cable 96 is the one to be certified dead. DC pulse transmitter 20 is connected through test lead 21 "A" through jumpers 105 to all of conductors 90, 91, 92, etc., of cable 96 under test. At the far end of cable 96, all of its conductors 93, 94, 95, etc., are connected through jumpers 106 to a neutral return conductor 100, if available, or to the metallic sheath of another cable 109, if available, or to another good earth ground system 99, or to an unused conductor in another cable 116. Transmitter 20 test lead 22 "B" is connected to the same return conductor, neutral, metallic sheath of another cable, or earth ground or unused conductor of another cable. In each of these cases the return conductor is external to receiver jaws 51. At the remote location where the cable is to be certified dead, receiver 50 is clamped around the entire cable assembly 96 including any metallic sheathing if present, fireproofing, or other outer covering. Meter 54 will give a positive "A" deflection if receiver jaws 51 are clamped around the correct cable 96. If receiver 50 should happen to be clamped around the wrong cable, meter 54 will either give a "B" deflection or no deflection at all.

TRANSMITTER 20

Figure 12:
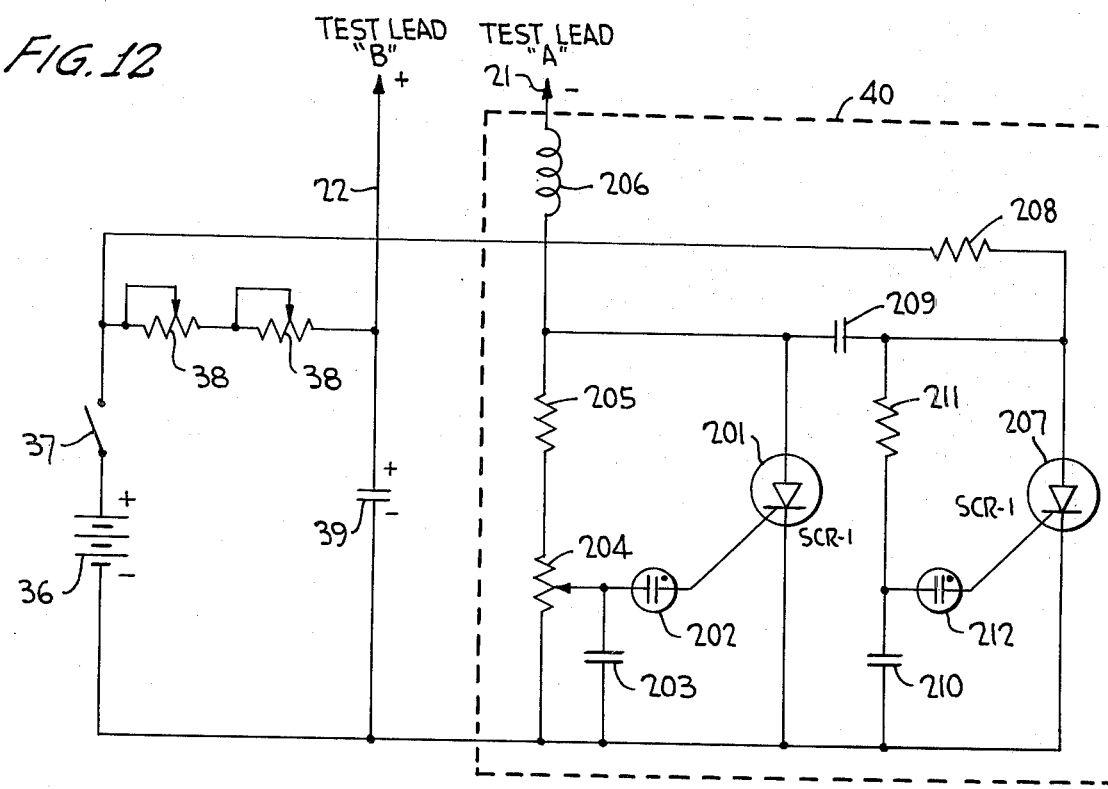

Numeral designations 21, 22, 36, 37, 38, 39 and 40 in FIG. 12 identify the same components as described above. FIG. 12 shows a preferred embodiment of the pulse transmitter 40. Inductor 206 limits output current to safe values. Resistor 205 and potentiometer 204 form a voltage divider to charge small capacitor 203. When the voltage across capacitor 203 rises to the breakdown voltage of neon lamp 202, neon lamp 202 conducts, thus discharging the small energy stored in capacitor 203 into the gate circuit of silicon controlled rectifier 201. This energy turns SCR 201 "on" so that it conducts and acts as the main pulse switching device whereby energy stored in main power capacitor 39 is discharged into the cable under test through test leads 21 and 22. With SCR 201 conducting, DC battery 36 continues to supply a small DC current through the externally connected cable under test and through SCR 201 even after power capacitor 39 is discharged. If this small current is large enough, SCR 201 will remain "on" and function as a continuously closed switch so that capacitor 39 cannot recharge for another pulse.

The purpose of silicon controlled rectifier 207 is to "turn off" SCR 201 so the power circuit can continue to pulse. Battery 36 supplies a small amount of current through resistor 208 to charge small capacitor 209. This current through resistor 208 also charges small capacitor 210 through resistor 211. When the voltage across capacitor 210 reaches the breakdown voltage of neon lamp 212, neon lamp 212 turns on and discharges the energy stored in capacitor 210 into the gate circuit of SCR 207 causing SCR 207 to turn "on". When SCR 207 turns "on", the energy in capacitor 209 is released in such a way that it "bucks" any current in SCR 201 causing current in SCR 201 to go to zero thus cutting "off" SCR 201. Power capacitor 39 then begins to recharge and the cycle repeats. By adjusting potentiometer 204, the circuit can be made to "fire" SCR 201 for a considerable range of different voltages across capacitor 39. Thus potentiometer 204 functions as a pulse energy control device. Variable resistors 38 control the current flow to capacitor 39, thus resistors 38 function as pulse rate control devices. Typical pulse rates may be from 1 to 5 seconds apart.

RECEIVER 50

Figure 13:
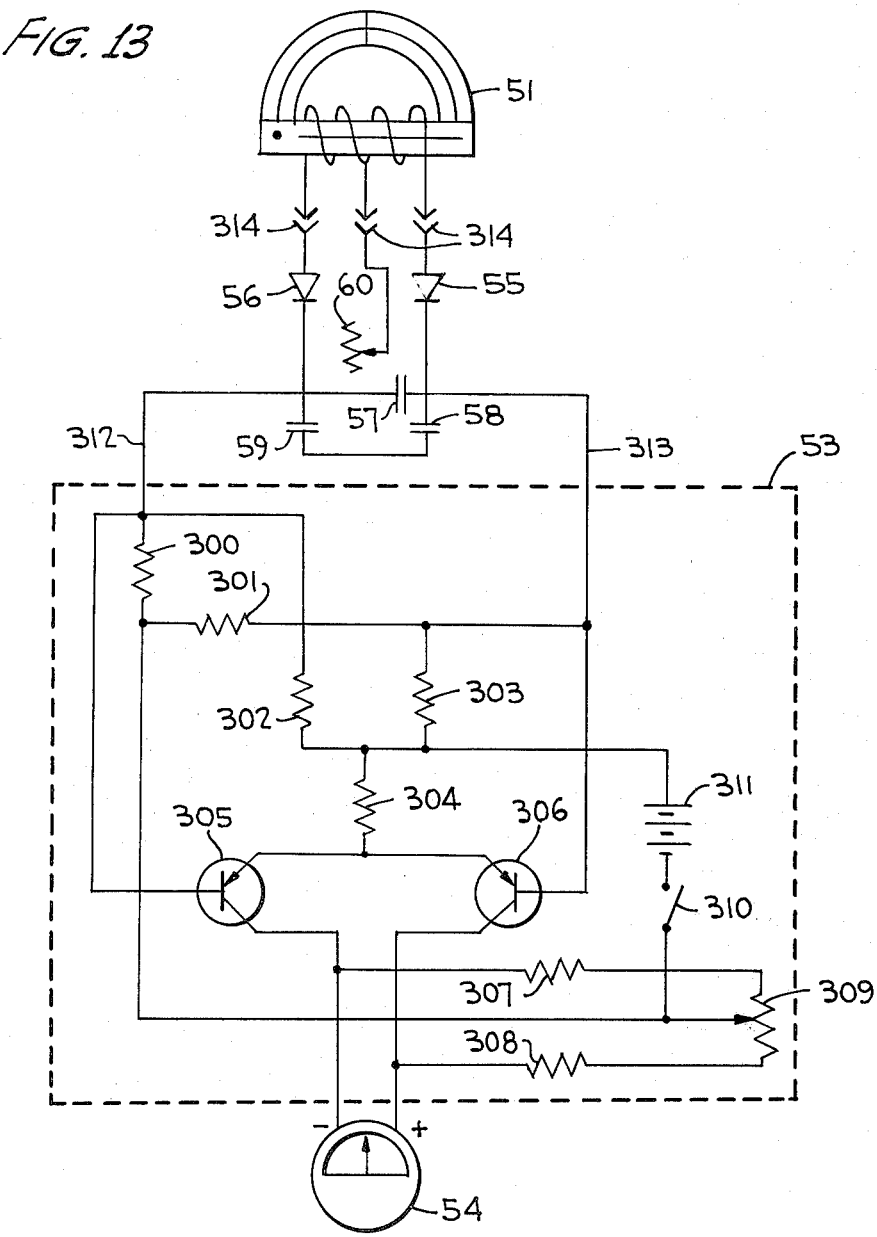

Numeral designations 51, 55, 56, 57, 58, 59, 60, 54 and 53 in FIG. 13 designate the same components as previously described. FIG. 13 shows a preferred embodiment of pulse amplifier 53. Resistors 300, 301, 302, 303 and 304 establish the bias currents for transistors 305 and 306. Resistors 307, 308 and potentiometer 309 are used to balance meter 54 at zero center. Battery 311 supplies power for the amplifier and switch 310 is used to turn power supply 311 on and off. A transmitted pulse from the cable under test is picked up by transformer 51 and the pulse enters amplifier 53 through leads 312 and 313. A pulse of predetermined polarity will cause transistor 305 to conduct more and transistor 306 to conduct less, thus upsetting the balanced conditions and causes meter 54 to deflect in a predetermined direction. A pulse entering leads 312 and 313 of opposite polarity will cause transistor 306 to conduct more and transistor 305 to conduct less again upsetting the balanced conditions and causing the meter to deflect in the opposite direction. 314 is a 3-conductor plug and jack at the face of the receiver that allows connection of transformer 51 by a 3-conductor cable to the receiver so that the transformer can be used at a distance several feet away from the receiver (down in a trench or manhole).

The provisions of the method and apparatus of this novel invention results in an improved form of certifying that a particular conductor or cable is dead in a more expeditious and safe manner and is believed to constitute a very definite and significant improvement and advancement of the art.

Various other changes which will become apparent to those skilled in the art may be made in the procedural steps of the method, or in the form, electrical characteristics and arrangements of elements of the apparatus, without departing from the spirit of the invention. For example, the method and apparatus of the invention may be used for checking the polarity of transformers in a technique known as "kicking" transformers.

What is claimed is:

1. A method for certifying that an insulated electrical conductor is dead at a point remote from the two ends at which end points it is known to be dead and wherein at least one energized and/or AC current carrying conductor is present at the remote point comprising the steps of:

electrically connecting a conductor to be certified to an electrical return path at one of said end points;
supplying a periodic DC current pulse at the other of said end points between said conductor to be certified and said return path to generate therein a net DC current pulse of the same polarity at said remote point along said conductor to be certified, a portion of said current pulse being returned along said electrical return path and the remaining portion of the current pulse being returned through an additional return path;
measuring the vector summation of all the currents in said electrical conductor to be certified and said electrical return path and thereby determining the polarity of the net DC pulse in the conductor to be certified at said remote point; and
determining that said electrical conductor is dead by ensuring that said measured polarity is the same as said same polarity.

2. The method as in claim 1 wherein the step of measuring is carried out by a detector utilizing a radiated electromagnetic field.

3. The method as in claim 1 wherein said step of measuring is carried out with an alternating current flowing in a return conductor.

4. The method as in claim 1 wherein said step of measuring determines the net difference in the radiated outgoing and returning DC current pulse simultaneously with the measurement of the polarity of the net DC pulse using the same receiver.

5. The method as in claim 1 further comprising the step of adding an external parallel return path prior to supplying said periodic DC current pulse for the purpose of certifying that a lone cable is dead.

6. The method as in claim 5 wherein said electrical conductor to be certified is one of multiple conductors having a concentric neutral conductor and further comprising the step of connecting a jumper cable to said neutral conductor on both sides of the receiver used for measuring the polarity of the net DC pulse for bypassing part of the return DC current pulse prior to supplying said periodic DC current pulse to said conductor to be certified.

* * * * *